UNITED STATES PATENT OFFICE.

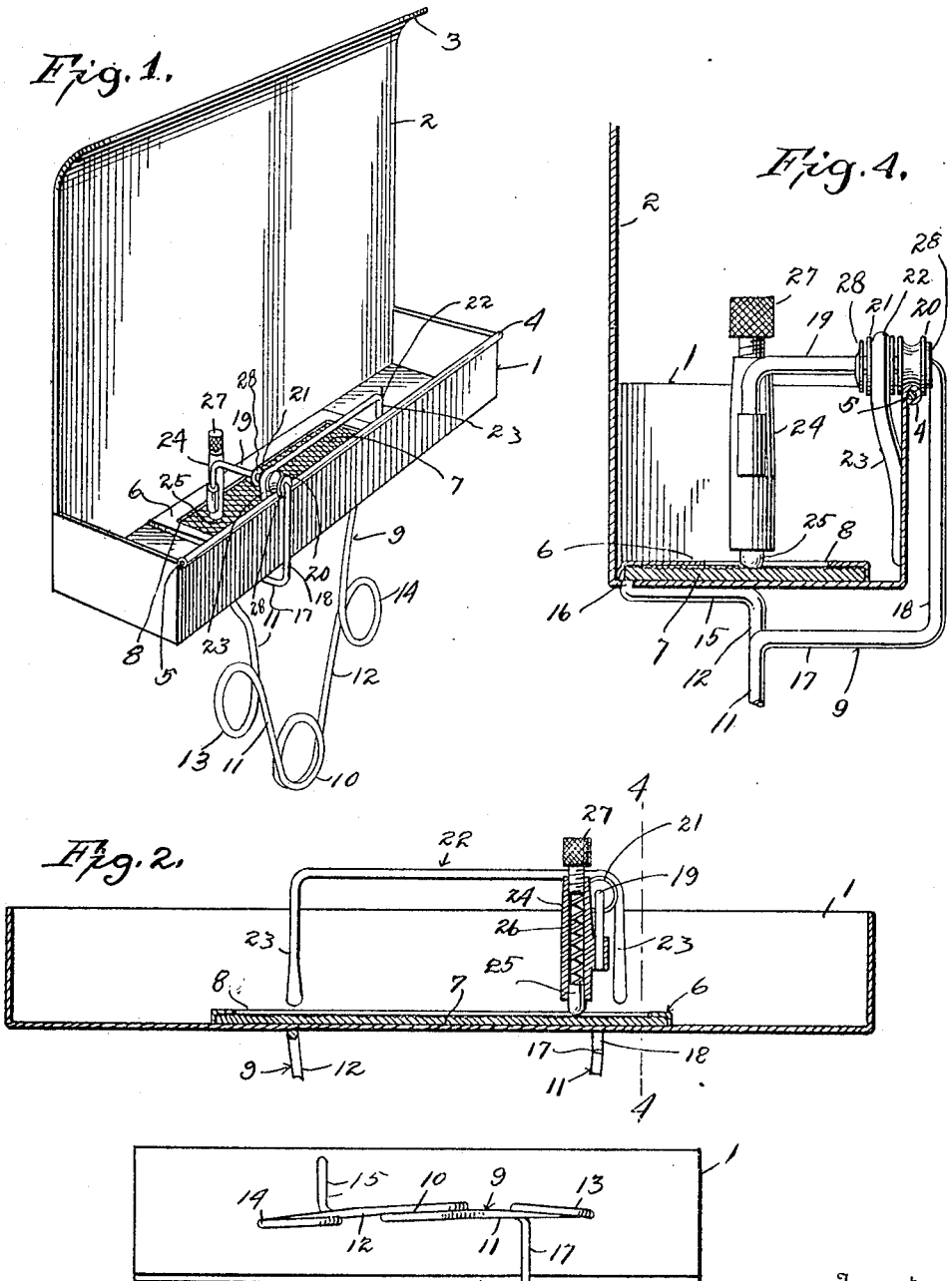

EDWARD R. WEISHAUPT, OF ROCHESTER, NEW YORK.

FLASH-LIGHT IGNITER.

1,207,105.  Specification of Letters Patent.  Patented Dec. 5, 1916.

Application filed January 21, 1916. Serial No. 73,483.

*To all whom it may concern:*

Be it known that I, EDWARD R. WEISHAUPT, a citizen of the United States, residing at Rochester, in the county of Monroe, State of New York, have invented certain new and useful Improvements in Flash-Light Igniters; and I do hereby declare the following to be a full, clear, and exact description of the invention, such as will enable others skilled in the art to which it appertains to make and use the same.

The present invention is directed to improvements in igniters for flash light pans, used by photographers, and has for its object to so construct a device of this character that the powder can be ignited in a simple and convenient manner.

A further object of the invention is to provide a device of this type constructed in such a manner that the igniting mechanism can be operated while holding the pan in one hand.

A still further object of the invention is to provide an igniting mechanism of this character which will effectively ignite the flash light powder in the pan upon simply actuating the pan supporting handle.

With these and other objects in view, this invention resides in the novel features of construction, formation, combination and arrangement of parts to be hereinafter more fully described, claimed and illustrated in the accompanying drawing, in which:—

Figure 1 is a perspective view of the device. Fig. 2 is a longitudinal sectional view through the device. Fig. 3 is a bottom plan view. Fig. 4 is a sectional view on line 4—4 of Fig. 2.

Referring to the drawing 1 indicates the pan which is elongated and has one wall terminating in a shield 2, said shield having its upper edge terminating in a curved flange 3, which will deflect the products of combustion forwardly and away from the operator. The other side wall of the pan is provided with a bead 4 in which is secured a strengthening rod 5. Fixed to the bottom of the pan is a casing 6, in which is mounted a metallic plate 7, said plate having its upper surface serrated or roughened and exposed through the opening 8 in the casing, the purpose of which will appear later.

A holding and actuating handle 9 is provided and is formed from a single length of resilient wire, and is bent intermediate its ends into a coil spring 10, the helices of which terminate in arms 11 and 12, said arms being provided with finger engaging loops 13 and 14, respectively.

The arm 12 is provided with a horizontal portion 15 which extends transversely of the bottom of the pan, and has its end provided with a projection 16 which extends into the pan and is soldered thereto, thus firmly holding the arm in place.

The arm 11 is provided with an offset 17 which terminates in a vertical arm 18, said arm having its upper end terminating in a shaft 19 which extends over the bead 4 of the pan and has rotatably mounted thereon grooved rollers 20 and 21, the former being adapted to ride on the bead 4, while the latter is adapted to engage the bight of the yoke 22, the arms 23 of which are fixed to the inner surface of the adjacent side wall of the pan 1.

The shaft 19 is fixed to the tube 24, said tube serving to receive the pyrophoric cylinder 25, the lower end of which is held in yielding engagement with the roughened surface of the plate 7 by the coil spring 26 which is mounted in the tube. The tension of the spring 26 can be regulated upon manipulation of the adjusting cap 27.

In use the thumb is placed in the loop 14 and the forefinger in the loop 13, whereupon pressure being applied upon the handle, the arm 11 will be moved toward the arm 12, thus causing the tube 24 to travel longitudinally within the pan so that the cylinder 25 will drag upon the plate 7, thus producing a spark which will ignite the powder in the pan.

By providing the rollers 20 and 21, which engage the bead 4 and bight of the yoke 22, respectively, lateral movement of the shaft 19 is prevented, but at the same time the shaft can travel longitudinally of the pan, whereby the tube 24 will be in a position to cause the pyrophoric cylinder 25 to positively engage the plate 7 so as to produce a spark to ignite the powder in the pan.

Fixed to the shaft 19 are disks 28, said disks serving to limit the lateral movement of said shaft.

What is claimed is:—

In a device of the class described, the combination with a pan, of a handle consisting of yieldably connected arms, one of said arms being fixed to the pan, the other arm having a shaft carried thereby, rollers carried by the shaft, a yoke fixed to one wall of the pan for engaging one of the rollers, the other of said rollers being engaged with the upper edge of one wall of the pan, a striking plate on the bottom of the pan, a tube supported by the shaft, a cylinder of pyrophoric material mounted in the tube for engaging the striking plate when the loosely connected arm is moved toward the fixed arm of the handle.

In testimony whereof I affix my signature in the presence of two witnesses.

EDWARD R. WEISHAUPT.

Witnesses:
ESTELLE M. WEIS,
MABELLE C. WEIS.

Copies of this patent may be obtained for five cents each, by addressing the "Commissioner of Patents, Washington, D. C."